United States Patent [19]

Hiza et al.

[11] Patent Number: 4,960,633
[45] Date of Patent: Oct. 2, 1990

[54] MICROWAVE-ABSORPTIVE COMPOSITE

[75] Inventors: Misao Hiza, Hiratsuka; Hajime Yamazaki, Hadano; Kazuhiro Sugihara, Hiratsuka; Tetsu So, Hiratsuka, all of Japan

[73] Assignee: The Yokohama Rubber Co., Ltd., Tokyo, Japan

[21] Appl. No.: 39,922

[22] Filed: Apr. 20, 1987

[30] Foreign Application Priority Data

Apr. 22, 1986 [JP] Japan .................................. 61-91280

[51] Int. Cl.$^5$ ...................... B32B 25/02; B32B 25/20; B32B 15/06
[52] U.S. Cl. ..................................... 428/215; 428/247; 428/256; 428/285; 428/287; 428/447; 428/458; 428/473.5; 428/480; 428/698; 219/10.55 D
[58] Field of Search ............... 219/10.55 D; 428/450, 428/215, 247, 256, 285, 287, 447

[56] References Cited

U.S. PATENT DOCUMENTS

| 3,239,669 | 3/1966 | Weinberger | 250/108 |
| 3,866,009 | 2/1975 | Ishino et al. | 219/10.55 D |
| 4,059,742 | 11/1977 | Baron | 219/10.55 D |
| 4,174,419 | 11/1979 | Nienart | 428/251 |
| 4,264,800 | 4/1981 | Jahnke et al. | 219/10.55 D |
| 4,310,786 | 1/1982 | Kumpfer et al. | |
| 4,435,072 | 3/1984 | Adachi et al. | 355/3 FU |
| 4,514,585 | 4/1985 | Daynton | 219/10.55 D |
| 4,542,271 | 9/1985 | Tanonis et al. | 219/10.55 E |
| 4,570,045 | 2/1986 | Jeppson | 219/10.55 D |
| 4,602,141 | 7/1986 | Naito et al. | 219/10.55 D |
| 4,640,838 | 2/1987 | Isakson et al. | 219/10.55 E |

Primary Examiner—George F. Lesmes
Assistant Examiner—Elizabeth M. Cole
Attorney, Agent, or Firm—Finnegan, Henderson, Farabow, Garrett & Dunner

[57] ABSTRACT

A microwave absorptive composite suitable for use in ships, aircrafts and the like comprises an outermost layer of a thermosetting resin-impregnated, fibrous sheet; an intermediate layer of a normally liquid, carbonblack-containing silicone rubber sheet; and an innermost layer of a reinforced thermosetting resin sheet, the three layers being integrally laminated in that order. The silicone rubber is curable at room temperature or with heat.

14 Claims, 1 Drawing Sheet

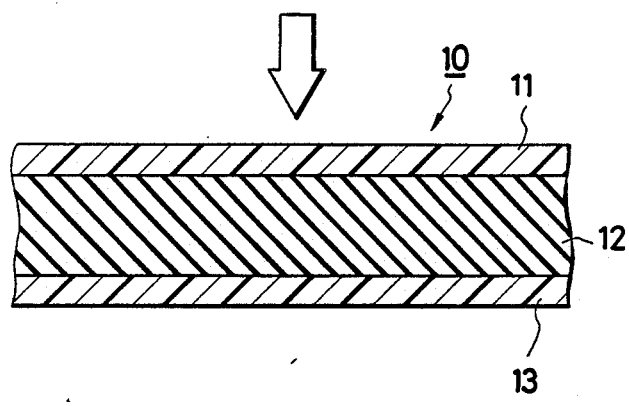

MICROWAVE-ABSORPTIVE COMPOSITE

BACKGROUND OF THE INVENTION

1. Field of the Invention

This invention relates to microwave-absorptive composite materials for use in, for example, ships, aircrafts and other mobile objects.

2. Prior Art

Microwave-absorptive materials are broadly classified into an attenuation type in which the energy of incident wave attenuates as it passes through the absorber, and a matching type in which the amount of reflection of incident wave on the front surface of the absorber and that of reflection of wave from a reflector on the rear surface of the absorber are controlled so as to in effect eliminate the generation of reflected wave.

A typical matching-type wave absorber well known in the art comprises an absorbing layer made up of a synthetic resin or rubber sheet carrying magnetic ferrite ($Fe_2O_3$). This type of material excels of course in wave absorption, but is rather heavy, hence unsuitable for light-weight applications and furthermore structurally weak as it is a resinous or rubber sheet simply admixed with ferrite. Attempts have been made to produce a light-weight microwave absorber from a rubber composition having therein carbon black particles dispersed therein in place of ferrite. Such an absorber, however, has been effective only in handling a narrow band of microwave frequencies. It has been known that wave absorption over wide frequency bands can be achieved by the use of multi-layered absorbers. This typically involves considerable difficulty in fabrication, however, chiefly because of the different characteristic properties of the different layers. The outermost layer usually consists of fiber-reinforced thermosetting resin. The intermediate layer contains carbon black particles to permit part absorption and part transmission an incident wave and hence cannot for this reason be the same composition as the outermost layer. Likewise, the innermost layer must be of a different composition having metal or carbon fibers to afford wave reflection. Thus, each of these layers has a different linear expansion coefficient with the result that the finished product upon formation with heat becomes strained, warped or otherwise deformed.

SUMMARY OF THE INVENTION

With the foregoing difficulties of the prior art in view, the present invention is aimed at the provision of an improved microwave absorptive composite which is capable of wave absorption over a wide frequency band. The composite is free from deformation or distortion, and has excellent heat resistance and structural strength.

These and other objects and features of the invention will be better understood from the following detailed description.

Briefly stated, the microwave absorptive composite according to the invention comprises an outermost layer which comprises an organic or inorganic fiberous sheet impregnated with a thermosetting resin; an intermediate layer which comprises a resinous sheet including a liquid silicone rubber admixed with carbon black; and an innermost layer which comprises a sheet of thermosetting resin reinforced with carbon fiber, metal fiber or wire mesh, a sheet of metal, a sheet of resin containing a particulate metal, or a resinous sheet surface-welded with a metal. The three layers are laminated together into an integral sheet structure.

BRIEF DESCRIPTION OF THE DRAWING

The accompanying drawing is a cross-sectional view of part of a microwave absorptive composite embodying the invention.

DETAILED DESCRIPTION OF THE PREFERRED EMBODIMENT

As shown in a drawing, the microwave absorptive composite 10 in accordance with a preferred embodiment of the invention comprises at least three different layers; i.e., an outermost layer 11, an intermediate layer 12, and an innermost layer 13 which are laminated or otherwise united in this order. The arrow indicates the direction of incidence of microwave radiation.

The outermost layer 11 comprises a thermosetting resin impregnated with an organic or inorganic fiber. The term "thermosetting resin" as used herein includes epoxy, unsaturated polyester, novolak and phenol resins. The organic fiber includes synthetic fibers of polyester, polyamide, acryl and polyvinyl alcohol, of which an aromatic polyamide fiber is preferred for its heat resistance and mechanical strength. The inorganic fiber includes silica, silicon carbide, alumina, and boron nitride. When impregnated in the thermosetting resin, the organic and inorganic fibers may be disposed in the form of a woven or knitted fabric, or a blind. Alternatively, the fibers may be simply combed unidirectionally where they are relatively long, or may be dispersed randomly where they are relatively short.

The outermost layer 11 may further consist of an additional layer or layers including small quantities of particulate carbon black admixed in the thermosetting resin.

The thickness of the outermost layer 11 is preferably in the range of 2.0–6.4 mm and, more preferably, in the range of 2.8–4.5 mm.

Turning to the intermediate layer 12, this comprises a silicone rubber admixed with carbon black particles. According to an important aspect of the invention, a normally liquid silicone rubber is used having a particulate carbon black dispersed therein. Conventional normally solid rubber, when added with carbon black, exhibits a dielectric loss factor (tan $\delta = \epsilon''/\epsilon'$) of much smaller than 1. In fact, this value would be as small as 0.41 in the case where 30 parts by weight of carbon black is used per 100 parts by weight of solid silicone rubber. In contrast to this, the tan $\delta$ value approximates 1 with liquid silicone rubber, which literally indicates increased absorption and reduced reflection of microwaves. The choice of silicone as the liquid rubber is attributed to its resistance to both heat and low temperature, rendering the wave absorber suitable for application with ocean-going vessels and aircraft, for example.

Liquid silicone rubber suitable for purposes of the invention is of a one-pack type such as de-acetic acid type, de-oxime type and de-acetone type, or of a two-pack type catalytically curable, both of which are curable preferably at room temperature but which may be cured with heat at about 50°–200° C.

The percentage of carbon black in the intermediate layer 12, though dependent upon the composition of the outermost layer 11, is preferably 50% by weight or less and, more preferably, 20–40% by weight, as it is difficult to obtain uniform distribution of more than 50 wt.% carbon black over the rubber layer. A plurality of layers may be provided each having a different percentage of carbon black. The thickness of the layer 12 is preferably 0.25-4 mm and, more preferably 0.8-2.0 mm.

The innermost layer 13 consists of a sheet of thermosetting resin reinforced with carbon fiber or wire mesh, a sheet of metal, a resinous sheet incorporating a particulate metal, or a resinous sheet surface-welded with a metal. The carbon fiber, if cut short, may be randomly dispersed, and if long, may be drawn unidirectionally together. It may be knitted into a grid form.

The thermosetting resin for the innermost layer 13 may be epoxy, unsaturated polyester, novolak, polyimide and phenol resins.

The wire mesh referred to above may be made of aluminum, iron, copper and brass.

The resinous sheet containing a particulate metal may be an epoxy resin and the particulate metal therefore may be aluminum, iron and copper.

The metal sheet used for the innermost layer may be a sheet of lightweight aluminum or aluminum alloys.

The above three layers 11, 12 and 13 are finally interconnected into an integral form. In this instance, the intermediate layer 12 may be pre-cured and sandwiched between the outer and inner layers 11 and 13 that are unhardened and then cured to set. Alternatively, the outer and inner layers 11 and 13 may be hardened separately, the intermediate layer 12 interposed therebetween, and then the three layers cured together, or all of the three layers may be separately cured and adhesively bonded together.

Inventive Example 1

A blend of resins including 80 grams of N,N,N',N'-tetraglycidyl di-(para-aminodiphenyl)-methane (tradenamed ELM 434, manufactured by Sumitomo Chemical Co.), 20 grams of cresol novolak epoxy (tradenamed ESCN 220 HH, manufactured by Sumitomo Chemical Co.), 44 grams of 1,3-propanediol di-para-aminobenzoate (tradenamed CUA-4, manufactured by Iraha Chemical Co.), and 0.5 gram of BF$_3$-monoethylamine complex (tradenamed Sumicure BF-M, manufactured by Sumitomo Chemical Co.) was formed into a sheet 0.25 mm thick which was laminated with a cloth of aromatic polyamide fiber (tradenamed Kevlar, manufactured by DuPont) and then impregnated with resin to provide a prepreg, (K-Pre). The resulting prepreg upon hardening, showed a glass-transition temperature of 230° C. In a similar manner, a prepreg (C-Pre) of carbon fiber cloth was prepared. 100 parts by weight of liquid silicone rubber (tradenamed KE-108, manufactured by Shinetsu Chemical Industry Co.) and 40 parts by weight of carbon black (ISAF) were admixed and pulverized by a paint mill. The rubber was press-formed at 80° C. and 10 kg/cm$^2$ for 30 minutes into a sheet 1.8 mm thick. This sheet was laminated on one side with 15 sheets of K-Pre and on the other side with 7 sheets of C-Pre, and then cured in an autoclave at 180° C. and 6.5 kg/cm$^2$ for 2 hours. The resulting composite was perfectly flat with no warp or sag, and showed microwave absorption capabilities above 14 dB over a given band when tested.

Inventive Example 2

K-Pre and C-Pre, both prepared as per Inventive Example 1, were cured in an autoclave. The rubber sheet was also made as in Inventive Example 1. The three layers were bonded together with a silicone adhesive. The resulting composite was flat and free of surface defects. Wave absorption tests showed above 20 dB over a given microwave band.

Comparative Example 1

An intermediate layer was prepared from a blend of thermosetting resins of the same composition as that of the outer and inner layers, the blend being similar to that of Inventive Example 1, and admixed with carbon black. The resinous layer was laminated on one side with C-Pre and on the other side with K-Pre, and cured in an autoclave. The resulting composite was warped. The intermediate layer cracked when cooled to room temperature.

Comparative Example 2

The intermediate layer was interposed between separately cured outer and inner layers and bonded in place with an adhesive of the same blend as the matrix resin for each layer. These bonded layers where then pressed into a sheet at 180° C. for 2 hours. The resulting composite sheet, when removed from the press, was considerably warped. This warping was attributable to large thermal expansion differences between the respective layers. Warping was not improved even through many different curing conditions for the adhesive.

Inventive Example 3

A blend of resins including 80 grams of N,N,N',N'-tetraglycidyl di-(para-aminodiphenyl)-methane (tradenamed ELM 434, manufactured by Sumitomo Chemical Co.), 20 grams of cresol novolak epoxy (tradenamed ESCN 220 HH, manufactured by Sumitomo Chemical Co.), 35 grams of 4,4'-diaminodiphenylsulfone (tradenamed Sumicure S, manufactured by Sumitomo Chemical Co.), and 0.5 gram of BF$_3$-monoethylamine complex (tradenamed Sumicure BF-M, manufactured by Sumitomo Chemical Co.) was formed into a sheet 0.25 mm thick which was laminated with a cloth of aromatic polyamide fiber (tradenamed Kevlar, manufactured by DuPont) and then impregnated with resin to provide a prepreg (K-Pre), as in Inventive Example 1. The resulting prepreg upon hardening, showed a glass-transition temperature of 235° C. In a similar manner, a prepreg (C-Pre) of carbon fiber cloth was prepared. 100 parts by weight of liquid silicone rubber (tradenamed KE-108, manufactured by Shinetsu Chemical Industry Co.) and 40 parts by weight of carbon black (ISAF) were admixed and pulverized by a paint mill. The rubber was press-formed at 80° C. and 10 kg/cm$^2$ for 30 minutes into a sheet 1.8 mm thick. This sheet was laminated on one side with 15 sheets of K-Pre and on the other side with 7 sheets of C-Pre, and then cured in an autoclave at 180° C. and 6.5 kg/cm$^2$ for 2 hours. The resulting composite was perfectly flat with no warp or sag, and showed microwave absorption capabilities above 15 dB over a given band when tested.

Inventive Example 4

A prepreg (G-Pre) was prepared from a cloth of glass fibers and a blend of resins including 72 grams of a resin primarily including bismaleimide-triazine resin (tradenamed BT 2160, manufactured by Mitsubishi Gas Chemical Co.), 28 grams of an expoxy resin (tradenamed Epikote 1001, manufactured by Yuka Shell Co.), and 0.22 gram of catalyst (0.02 gram of zinc octanonate and 0.2 gram of dicumyl peroxide), as in Inventive Example 1. A prepreg (C-Pre) was also prepared from the same blend of resins and a cloth of carbon fibers, as in Inventive Example 1. The resulting prepreg, upon hardening showed a glass-transition temperature of 220° C. 100 parts by weight of liquid silicone rubber (tradenamed KE-108, manufactured by Shinetsu Chemical Industry Co.) and 40 parts by weight of carbon black (ISAF) were admixed and pulverized by a paint mill. The rubber was press-formed at 80° C. and 10 kg/cm² for 30 minutes into a sheet 1.8 mm thick. This sheet was laminated on one side with 15 sheets of G-Pre and on the other side with 7 sheets of C-Pre, and then cured in an autoclave at 180° C. and 6.5 kg/cm² for 2 hours. The resulting composite was perfectly flat with no warp or sag, and showed microwave absorption capabilities above 14 dB over a given band when tested.

Many changes and modifications may be made in the specific embodiments described above as would be apparent to one skilled in the art without departing from the scope of the appended claims and their legal equivalents.

What is claimed is:

1. A microwave absorptive composite comprising:
   an outermost layer including a fibrous sheet impregnated with a thermosetting resin;
   an intermediate layer including a resinous sheet of a normally liquid silicone rubber admixed with carbon black; and
   an innermost layer including a thermosetting resin sheet reinforced with at least one of a carbon fiber, metal fiber or wire mesh, a sheet of metal, a sheet of resin containing a particulate metal, and a resinous sheet surface-welded with a metal, said intermediate layer being interposed between said outermost and innermost layers and said layers being laminated together into an integral sheet structure.

2. A microwave absorptive composite according to claim 1 wherein said carbon black is present in an amount of less than 50 parts by weight per 100 parts by weight of said silicone rubber.

3. A microwave absorptive composite according to claim 1 wherein said fibrous sheet of said outermost layer includes at least one of polyester, polyamide, acryl and polyvinyl alcohol fibers.

4. A microwave absorptive composite according to claim 1 wherein said fibrous sheet of said outermost layer comprises at least one of silica, silicon carbide, alumina and boron nitride fibers.

5. A microwave absorptive composite according to claim 1 wherein said thermosetting resins of said outermost and innermost layers include at least one of epoxy, unsaturated polyester, novolak, polyimide and phenol resins.

6. A microwave absorptive composite according to claim 1 wherein said outermost layer has a thickness within the range of 2.0-6.4 mm.

7. A microwave absorptive composite according to claim 1 wherein said silicone rubber is of a one-pack type curable at room temperature.

8. A microwave absorptive composite according to claim 1 wherein said intermediate layer has a thickness within the range of 0.25-4 mm.

9. A microwave absorptive composite according to claim 1 wherein said wire mesh in said innermost layer includes at least one of aluminum, iron, copper and brass.

10. A microwave absorptive composite according to claim 1 wherein said fibrous sheet of said outermost layer includes at least one of organic and inorganic fibers.

11. A microwave absorptive composite according to claim 1 wherein said carbon black is present in an amount of 20-40% by weight of said intermediate layer.

12. A microwave absorptive composite according to claim 1 wherein said carbon black is present in an amount not in excess of 50% by weight of said intermediate layer.

13. A microwave absorptive composite according to claim 1 wherein said silicone rubber is of a two-pack type catalytically curable at about 50°-200° C.

14. A microwave absorptive composite according to claim 1 wherein said intermediate layer has a thickness within the range of 0.8-2.0 mm.

* * * * *